(12) United States Patent
Stopler et al.

(10) Patent No.: US 8,792,057 B2
(45) Date of Patent: Jul. 29, 2014

(54) METHODS CIRCUITS DEVICES AND SYSTEMS FOR WIRELESS COMMUNICATION OF VIDEO INFORMATION

(75) Inventors: Daniel Stopler, Holon (IL); Guy Dorman, Holon (IL); Yonv Levinbook, Tel Aiv (IL)

(73) Assignee: Amimon Ltd, Herzlia (IL)

( * ) Notice: Subject to any disclaimer, the term of this patent is extended or adjusted under 35 U.S.C. 154(b) by 681 days.

(21) Appl. No.: 12/926,195

(22) Filed: Nov. 1, 2010

(65) Prior Publication Data

US 2012/0105729 A1    May 3, 2012

(51) Int. Cl.
*H04N 5/40* (2006.01)
*H04N 21/414* (2011.01)
*H04N 21/443* (2011.01)
*H04N 5/38* (2006.01)
*H04N 21/63* (2011.01)
*H04N 21/61* (2011.01)

(52) U.S. Cl.
CPC .......... *H04N 5/38* (2013.01); *H04N 21/41407* (2013.01); *H04N 21/4436* (2013.01); *H04N 21/632* (2013.01); *H04N 21/6181* (2013.01); *H04N 21/6131* (2013.01)
USPC ......................................................... 348/723

(58) Field of Classification Search
USPC .................... 348/723, 730, E05.093, E05.127
See application file for complete search history.

(56) References Cited

U.S. PATENT DOCUMENTS

| | | | | |
|---|---|---|---|---|
| 7,430,430 | B2* | 9/2008 | Li et al. | 455/522 |
| 7,684,760 | B2* | 3/2010 | Kwak | 455/69 |
| 2010/0158103 | A1* | 6/2010 | Ye et al. | 375/240.02 |
| 2011/0127953 | A1* | 6/2011 | Walley et al. | 320/108 |

\* cited by examiner

*Primary Examiner* — Duc Nguyen
*Assistant Examiner* — Theodore Ndje
(74) *Attorney, Agent, or Firm* — Eitan, Mehulal & Sadot

(57) ABSTRACT

Disclosed are methods, circuits, devices systems for wireless communication of video information. According to some embodiments, an energy level of one or a group of transmit video block(s) to be transmitted as part of a wireless transmission frame may be adjusted so at to maintain a substantially constant transmission power (e.g. within a range of transmission power levels).

14 Claims, 9 Drawing Sheets

METHODS CIRCUITS DEVICES AND SYSTEMS FOR WIRELESS COMMUNICATION OF VIDEO INFORMATION

FIELD OF THE INVENTION

Some embodiments relate generally to the field of wireless communication and, more particularly, to methods, circuits, devices and systems of wireless video communication.

BACKGROUND

Wireless communication has rapidly evolved over the past decades. Even today, when high performance and high bandwidth wireless communication equipment is made available there is demand for even higher performance at a higher data rates, which may be required by more demanding applications.

Video signals may be generated by various video sources, for example, a computer, a game console, a Video Cassette Recorder (VCR), a Digital-Versatile-Disc (DVD), a Blu-ray (BR) disk player, or any other suitable video source. In many houses, for example, video signals are received through cable or satellite links at a Set-Top Box (STB) located at a fixed point.

In many cases, it may be desired to place a screen or projector at a location in a distance of at least a few meters from the video source. This trend is becoming more common as flat-screen displays, e.g., plasma or Liquid Crystal Display (LCD) televisions are hung on a wall. Connection of such a display or projector to the video source through cables is generally undesired for aesthetic reasons and/or installation convenience. Thus, wireless transmission of the video signals from the video source to the screen is preferred.

WHDI—Wireless Home Digital Interface is a standard for wireless high-definition video connectivity between a video source (e.g. cable box) and video sink (e.g. display). It provides a high-quality, uncompressed wireless link which can support delivery of equivalent video data rates of up to 3Gbit/s (including uncompressed 1080 p) in a 40 MHz channel within the 5 GHz and 720 p) can be delivered on a single 20 MHz channel in the 5 GHz unlicensed band, conforming to worldwide 5 GHz spectrum regulations. Range is beyond 100 feet (30 m), through walls, and latency is less than one millisecond.

The original WHDI design utilizes RF communication signals in the 5 GHz band thus providing a communication channel bandwidth of 20-40 MHz. Since line-of-sight (LOS) isn't required between transmitters and receivers operating in the 5 GHz band, multiple antennas are often used in a Multiple-Input-Multiple-Output (MIMO) arrangement, thereby increasing the effective bandwidth and thus improving data transmission speed, signal quality and error protection.

Future WHDI implementations may use RF signals in the 60 GHz band, providing a larger communication channel bandwidth (e.g. 2 GHz), thereby increasing data transmission rate, data protection and/or integrity of the data. Since RF signals in the 60 GHz band have a degraded Signal-to-Noise-Ratio (SNR) and/or dynamic range compared to the 5 GHz band, signals may be transmitted using focused beams and LOS between transmitters and receivers.

High quality (i.e. low noise with large dynamic range) amplifiers, digital-to-analog and analog-to-digital converters are desirable for both current and future video transmission technologies, including current and future WHDI based technologies. However, there is usually a tradeoff between low noise and dynamic range in amplifiers and converters. Thus, an additional challenge in implementing video transmission systems is the crest factor or peak-to-average ratio (PAR), i.e. the ratio of the instantaneous peak value to the root-mean-square (RMS) average value, of video data signals. Since edges and/or effects occur spontaneously in video data, a digital representation of the video data may contain many unexpected peaks resulting in a substantially high PAR. These spatially localized relatively high peeks can be detrimental or detract from the ability of amplifiers and converters to accurately sample, transmit, receive, synthesize and/or otherwise process portions of a frame of a relatively high bandwidth video signal.

There is thus a need in the field of wireless communication for improved methods, circuits, devices and systems for transmission of video data. There is yet a further need for improved methods, circuit, devices and systems of compensating for energy variations in transmission energy levels associated with different video frames and different video frame blocks associated with a video transmission. There is yet a further need for improved methods, circuits, devices and system of maintaining relatively stable (e.g. substantially constant) transmission power output for video transmitters.

SUMMARY OF INVENTION

The present invention includes methods, circuits, devices and systems for wireless communication of video information. According to some embodiments, there may be provided a wireless video source transceiver including a transmission block generator adapted to convert a set of pixel values (e.g. a video block of a video frame) into a video transmission block suitable for transmission. Functionally associated digital gain control logic may be adapted to determine an energy adjustment factor to be applied (digitally or via an analog amplifier) to the video transmission block such that transmission power fluctuations of a functionally associated transmitter is mitigated during transmission of the block. The wireless video source transceiver may further include a video block energy estimator adapted to estimate an energy value or level for the transmission block. The video block energy estimator may be further adapted to estimate the energy level of a set of video transmission blocks to be transmitted together. The digital gain control logic may be further adapted to determine a common energy adjustment factor to be digitally applied to the set of video transmission blocks. The common energy adjustment factor to be digitally applied to the set of video transmission blocks may be selected such that a total energy value/levels of the set of blocks is adjusted to a value within a target energy range. The target energy range may be substantially constant across multiple video transmission block sets. The digital gain control logic may further be adapted to determine whether to apply a common energy adjustment factor to a given video transmission block in the set of blocks based on an output of said video block energy estimator.

According to further embodiments, the wireless video source transceiver may include a transmitter adapted to transmit a set of video transmission blocks, wherein transmission of a given set of blocks includes transmission of information relating to energy value/level adjustments performed on one or more video transmission blocks in the set. Transmission of a given set of blocks may include transmission of information relating to a common gain factor associated with (e.g. applied to) the set of blocks. According to further embodiments, values within two or more video transmission blocks may be transposed or scrambled such that energy value deviations across the two or more video transmission blocks is mitigated.

According to some embodiments a wireless video sink transceiver may include a receiver adapted to receive a set of video transmission blocks along with an indicator indicating whether a given received video transmission block was digitally adjusted by a gain factor. The video sink transceiver may include a video block energy adjustor adapted to adjust an energy level of the given received video transmission block. The video block energy adjustor may be adapted to reverse the energy adjustment performed on the given block. The indicator may be for a common gain factor of the set of blocks. The indicator may be a vector and may further include information about which blocks in the set were adjusted by the common gain factor. The video block energy adjustor may be adapted to perform reverse energy adjustment on blocks adjusted by the common gain factor. The transceiver may include a pixel value generator adapted to convert a received and energy adjusted transmission block into a set of pixel values suitable for viewing on a video sink device.

The present invention may include methods, circuits, devices and systems for wireless communication of video information. According to some embodiments of the present invention, there may be provided a source-side transceiver, integral or otherwise functionally associated with a video source (e.g. video stream source such as a DVD Player, Set-Top Box, Videogame Console, etc.). The transceiver may include video processing circuits and/or logic (e.g. baseband processor) for converting a video stream (i.e. sequence of video frames) into one or more transmit video blocks or segments suitable for wireless transmission over a wireless data link. According to some embodiments of the present invention, the video processing circuits/logic may adjust an energy level of one or more transmit video blocks so as to maintain a substantially stable transmit power on a functionally associated downlink transmitter (e.g. transmit power is substantially constant or within a range of acceptable transmit power level) across multiple transmit video blocks of the same video frame and optionally across multiple video frames. An energy adjusted transmit video block may be transmitted to a video sink-side transceiver along with information indicating a factor by which the block's energy level was adjusted (e.g. digital amplification or digital attenuation factor). The sink-side transceiver, via a video block processor or processing logic, may perform an inverse energy level adjustment on a received transmit video block. The inverse adjustment may be based on received information indicating the factor by which the received block's energy level was adjusted at the source-side transceiver prior to transmission.

According to some embodiments of the present invention, there may be provided a video source (source-side) transceiver adapted to: (1) receive a video signal or stream from an integral or functionally associated video source, (2) process the video signal for transmission (e.g. baseband processing or transmit processing) into transmit video blocks, and (3) to transmit the transmit video blocks to a video sink-side transceiver via a downlink transmit chain (e.g. downlink transmitter). A baseband processor or logic circuit may perform processing steps including: (1) video frame segmentation into video frame segments or video frame blocks, (2) video segment/block transform (e.g. Discrete Cosine Transform), and (3) video frame segment (e.g. transmit video blocks) energy adjustment, either before or after performing a transform. It should be understood by one of ordinary skill in the art that the video segment/block transform step may include any image transform known today or to be devised in the future, including de-correlating transforms, space to frequency domain transforms, temporal to frequency domain transform, etc. Additionally, the video frame segment/block energy adjustment step may be incorporated as part of either the segmentation or transform step. It should also be understood that the video segment/block transform step may be skipped entirely according to some embodiments.

According to some embodiments of the present invention, frame segment energy adjustment of a given frame segment may be based on a measurement or estimation of energy within the given frame segment. A frame segment/block energy measurement module, integral or functionally associated with the adjustment logic, may measure or estimate an energy level of one or more video frame segments/block to be transmitted. Energy measurement may be performed either before or after a transform is (optionally) applied to the video frame segment/block. The frame segment/block energy adjustment logic may be adapted to adjust the energy level of the given frame to a target transmission energy level or to a target range of transmission energy levels. According to some embodiments of the present invention, the target energy level or target range for a video frame segment/block may be similar or substantially the same across multiple frame segments/blocks (e.g. transmit video blocks of a frame) and/or across multiple frames (e.g. some or all of the frames of a given video provided by the video source). Accordingly, the frame segment/block energy adjustment logic may calculate or otherwise determine either a digital amplification factor or a digital attenuation factor for a given video frame segment/block by comparing the given segment's or block's measured energy level against the target energy level for the segment/block. One method of determining a digital amplification/attention factor according to embodiments of the present invention is dividing a value representing the target energy level by a second value representing the measured segment/block energy level. Other methods of determining an amplification/attenuation factor will be evident to one of skill in the art—any of which methods, currently known or to be devised in the future, may be applicable to the present invention.

According to further embodiments of the present invention, groups or sets of video frame segments/blocks may be assigned a collective group/set target transmission energy level. The blocks energy adjustment logic may determine a cumulative energy level for a group/set of segments/blocks which may be transmitted together, for example as part of the same transmission frame. Based on a comparison of the set/group target energy level against a total of all the measured energy levels in all of the blocks/segments of the group/set, the adjustment logic may determine a digital amplification or digital attenuation factor for the entire group/set of video frame blocks/segments. The digital amplification or digital attenuation factor may be selected such that by adjusting all or some of the blocks/segments in the group/set, the target group/set transmission energy level is achieved. The group/set digital amplification or digital attenuation factor may be transmitted to a sink-side transceiver along with the group/set of blocks/segments. According to embodiments of the present invention where only some of the blocks/segments are adjusted based on the group/set factor, one or more flags or indicators are also transmitted to the sink-side transceiver to indicate which blocks/segments were adjusted and should be inversely adjust by the group/set factor.

According to embodiments of the present invention including processing of groups of blocks/segments concurrently, block/segment energy adjustment may be achieved by scrambling DCT (Discrete Cosine Transform) coefficients' values across multiple blocks, thereby evening out the energy across the group of blocks/segments. According to embodiments of the present invention utilizing DCT transforms, a Hadamard block transform is one example of a method which may be used to scramble DCT taps/values over a super block (i.e. a group/set of blocks), thereby moving energy/power from high energy/power DCT taps to low energy/power DCT taps. According to some embodiments, the data associated with the DCT tables may also be multiplied by a pseudorandom binary sequence (PRBS), which PRBS may be random in a sense that the value of an $\alpha_j$ element is independent of the values of any of the other elements, similar to real random sequences. A Hadamard transform may be used to provide an output whose taps/values have less variation in power/energy level. One possible outcome of scrambling DCT taps/values across a set of blocks (equalizing the energy/power across the blocks) is that a larger (common) gain on either the digital or analog amplifier is made possible for the group/set of blocks/segments.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
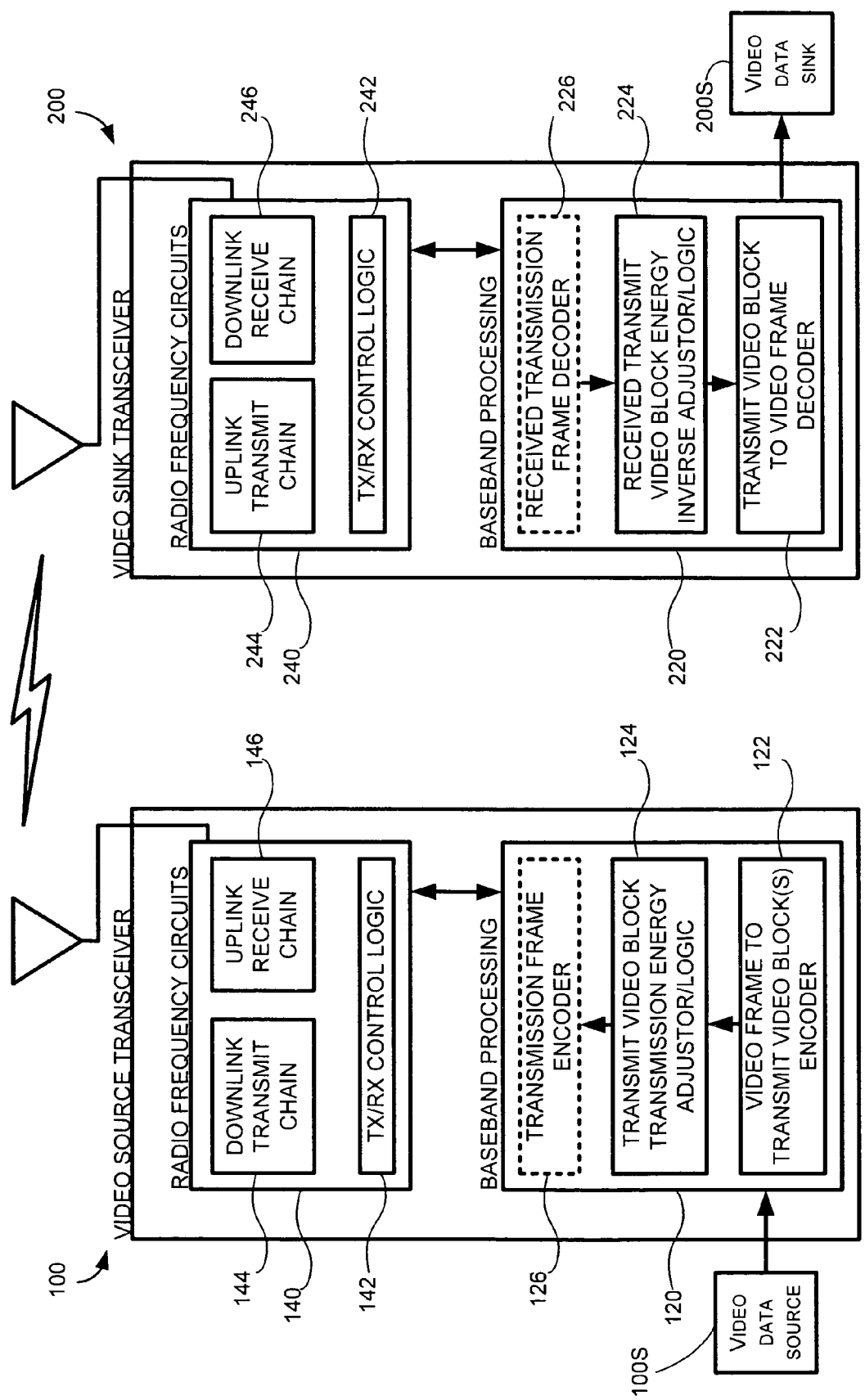
FIG. 1 shows block diagrams of exemplary wireless video source and video sink transceivers pair according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, DVDs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It should be understood that some embodiments of the present invention may be used in a variety of applications. Although embodiments of the invention are not limited in this respect, one or more of the methods, devices and/or systems disclosed herein may be used in many applications, e.g., civil applications, military applications or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories. In some demonstrative embodiments the methods, devices and/or systems disclosed herein may be used in the field of professional A/V, for example, as part of any suitable camera, video camera, and/or A/V accessories. In some demonstrative embodiments the methods, devices and/or systems disclosed herein may be used in the medical field, for example, as part of any suitable endoscopy device and/or system, medical video monitor, and/or medical accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

Although embodiments of the invention are not limited in this respect, one or more of the methods, devices and/or systems disclosed herein may be used to wirelessly transmit video signals, for example, High-Definition-Television (HDTV) signals, between at least one video source and at least one video destination. In other embodiments, the methods, devices and/or systems disclosed herein may be used to transmit, in addition to or instead of the video signals, any other suitable signals, for example, any suitable multimedia signals, e.g., audio signals, between any suitable multimedia source and/or destination.

Although some demonstrative embodiments are described herein with relation to wireless communication including video information, embodiments of the invention are not limited in this respect and some embodiments may be implemented to perform wireless communication of any other suitable information, for example, multimedia information, e.g., audio information, in addition to or instead of the video information. Some embodiments may include, for example, a method, device and/or system of performing wireless communication of AN information, e.g., including audio and/or video information. Accordingly, one or more of the devices, systems and/or methods described herein with relation to video information may be adapted to perform wireless communication of A/V information.

The present invention includes methods, circuits and systems for mitigating transmission power fluctuations of a wireless video data baring signal. According to some embodiments, there are provided methods, circuits, devices and systems for power adjustment of wireless transmission signals to compensate for variable power levels of a video source signal. According to some embodiments of the present invention, there is provided a video source transceiver which may wirelessly transmit a video stream to a corresponding video sink transceiver via a transmitter. According to some embodiments of the present invention, at least some of the data associated with the video stream may be in the form of transform coefficients (e.g. Discrete cosine transform coefficients—DCTs) derived from underlying video frame pixel data. According to further embodiments of the present invention, the transmitter may be an orthogonal frequency-division multiplexing (OFDM) based transmitter adapted to transmit transform coefficient data using transmission symbols. According to some embodiments of the present invention, the video source transceiver may be adapted to transmit a variable (fluctuating) power video signal as substantially constant power fine OFDM symbols (i.e. within a specified range of acceptable transmission power levels).

According to some embodiments of the present invention, the video source transceiver may include a transmission block generator adapted to convert a set of pixel values from a video frame into a video transmission block (transmit video block) suitable for transmission (e.g. DCT blocks). According to further embodiments of the present invention, a functionally associated or otherwise integral video block energy estimator or measurement module may be adapted to estimate or measure an energy value for a given transmission block or for a group transmission blocks. According to some embodiments of the present invention, transmission block elements associated with a coarse feature of a video frame may have a substantially lower energy value/level than transmission block elements associated with relatively fine features of the video frame. According to further embodiments of the present invention, the video source transceiver may digitally amplify and/or digitally attenuate the energy level of a transmission/transmit video block with a gain value, which gain value may also be negative and thus considered an attenuation value. The application or attenuation may be performed before or in concert with transmission symbol processing/forming such that the transmission signal is maintained at a substantially constant power (e.g. within some range of values or levels). Along with the transmit block(s) whose energy has been digitally amplified or attenuated, the video source transceiver may also transmit an indication (e.g. a value, variable or a vector) indicating by which value the block has been amplified or attenuated—thereby providing a receiving sink-side transceiver a means by which to recover the original transmit block.

According to some embodiments of the present invention, the video block energy estimator or measuring module may be further adapted to estimate an energy value for a group of transmission blocks. According to further embodiments of the present invention, the video source transceiver may determine a group gain value for a given group of transmission blocks and may determine whether a given block in the given group should be digitally amplified or attenuated with the group gain value. The video source transceiver may transmit a given video transmission block along with the group gain/attenuation value associated with the given transmission block and an indicator of which of the given transmission blocks digitally amplified/attenuated with the group value.

According to some embodiments of the present invention, a transmission symbol associated with a relatively fine or minor features of the video stream may be buffered before transmission. According to further embodiments of the present invention, the video block energy estimator may be further adapted to estimate an energy value for the fine transmission symbol. The video source transceiver may digitally amplify the fine transmission symbol by a gain value correlated to a ratio of a target power value and the estimated symbol energy value. The video source transceiver may transmit the fine transmission symbol along with the correlated gain value.

According to some embodiments of the present invention, there is provided a video sink transceiver which may wirelessly receive a video stream from a corresponding video source transceiver via a receiver. According to some embodiments of the present invention, at least some of the data associated with the video stream may be in the form of transform coefficients (e.g. DCTs) derived from underlying video frame pixel data. According to further embodiments of the present invention, the receiver may be an orthogonal frequency-division multiplexing ("OFDM") based receiver, which may receive data as transmission symbols. According to some embodiments of the present invention, the video sink transceiver may receive fine OFDM transmission symbols associated with fine image details, and the fine symbols may be maintained at a substantially constant power level (i.e. within a specified range of acceptable transmission power values or levels).

According to some embodiments of the present invention, the video sink transceiver may include a receiver adapted to receive a video transmission block, including an indicator for the video transmission block indicating whether it (i.e. values within the block) was digitally amplified or attenuated. The video sink transceiver may receive a gain value for the video transmission block. According to further embodiments of the present invention, an integral or otherwise functionally associated video block energy attenuator/amplifier/modifier may be adapted to modify the transmit video block by the received gain value or by a predetermined constant gain value. According to further embodiments of the present invention, the video sink transceiver may include a pixel value generator adapted to convert a transmission block into a set of pixel values (video block) suitable for projecting, rendering and/or viewing on a functionally associated video sink device.

According to some embodiments of the present invention, the video sink transceiver may include a receiver adapted to receive a group of video transmission blocks (as part of one or more transmission frames), wherein reception of a given group of transmission blocks may include an indicator for each transmission block indicating whether it was digitally amplified/attenuated by a group gain value. According to further embodiments of the present invention, the video sink transceiver may determine whether a given transmit video block was amplified and may determine its group gain value. A transmit video block energy modifier may be adapted to modify the given block by an amount inverse to the group gain value used to modify the block at the source transceiver. According to further embodiments of the present invention, the video sink transceiver may include a pixel value generator adapted to convert a transmission video block into a set of pixel values (video block) suitable for a video sink.

According to some embodiments of the present invention, the video sink transceiver may receive a transmission symbol associated with a relatively fine or minor features of the video stream with a correlated gain value. The video sink transceiver may attenuate the fine transmission symbol by the received correlated gain value. According to further embodiments of the present invention, the video sink transceiver may include a block generator to convert the fine transmission symbol into one or more elements/values of a video block. A functionally associated pixel value generator may convert the transmission block into a set of pixel values (e.g. video block or video frame) suitable for a functionally associated video sink.

Turning now to FIG. 1, there is shown a block diagram of an exemplary wireless video source transceiver and a wireless video sink transceiver pair according to embodiments of the present invention. The source-side transceiver 100 may include all the conventional circuitry associated with a digital RF transceiver including radio frequency circuitry 140: (1) such as uplink RF circuits/chain 146, (2) downlink RF circuits/chain 144, and (3) RF TX/RX control logic/controller 142. According to embodiments, the source-side transceiver 100 may include a transmit video block encoder 122, a transmit video block energy adjustor logic 124 and a transmission frame encoder 126. The transmit video block encoder 122 is adapted to convert a video frame block (e.g. video block composed of pixel values) into a transmit video block suitable for transmission (e.g. block composed of values/elements/vectors such as frequency coefficients derived video block composed of pixel values). The transmit video block energy adjustor logic 124 serves to adjust transmit video block(s) energy values/levels by adjusting values/elements/vectors within the transmit video block(s), such that transmission power fluctuations during transmission of the video transmit blocks (e.g. as part of one or more transmission frames) are mitigated—thereby maintaining a substantially constant transmit output power (within a range) at the TX circuits 144. Transmission frame encoder 126 may aggregate and/or encapsulate data from one or more video blocks into a transmission frame, which transmission frame may be wirelessly transmitted by the RF circuits 140 to the video sink transceiver 200.

The video sink transceiver 200 may include radio frequency circuitry 240 including downlink receive circuitry/chain 246 and uplink transmit circuitry/chain 244. A transmission frame decoder 226 may extract one or more transmit video frames from a received transmission frame. Received transmit video block energy inverse adjustor/logic 224 may perform an inverse energy level adjustment on a received transmit energy block(s), wherein the inverse adjustment is a reversal (i.e. same magnitude and opposite direction) of any energy level adjustment which may have been performed on the transmit video block at the source-side transceiver 100. A transmit video block to video frame decoder 222 may convert (e.g. frequency to space domain conversion) one or a set of transmit video blocks into portions of a renderable/viewable video frame (set of pixel values).

Figure 2A:
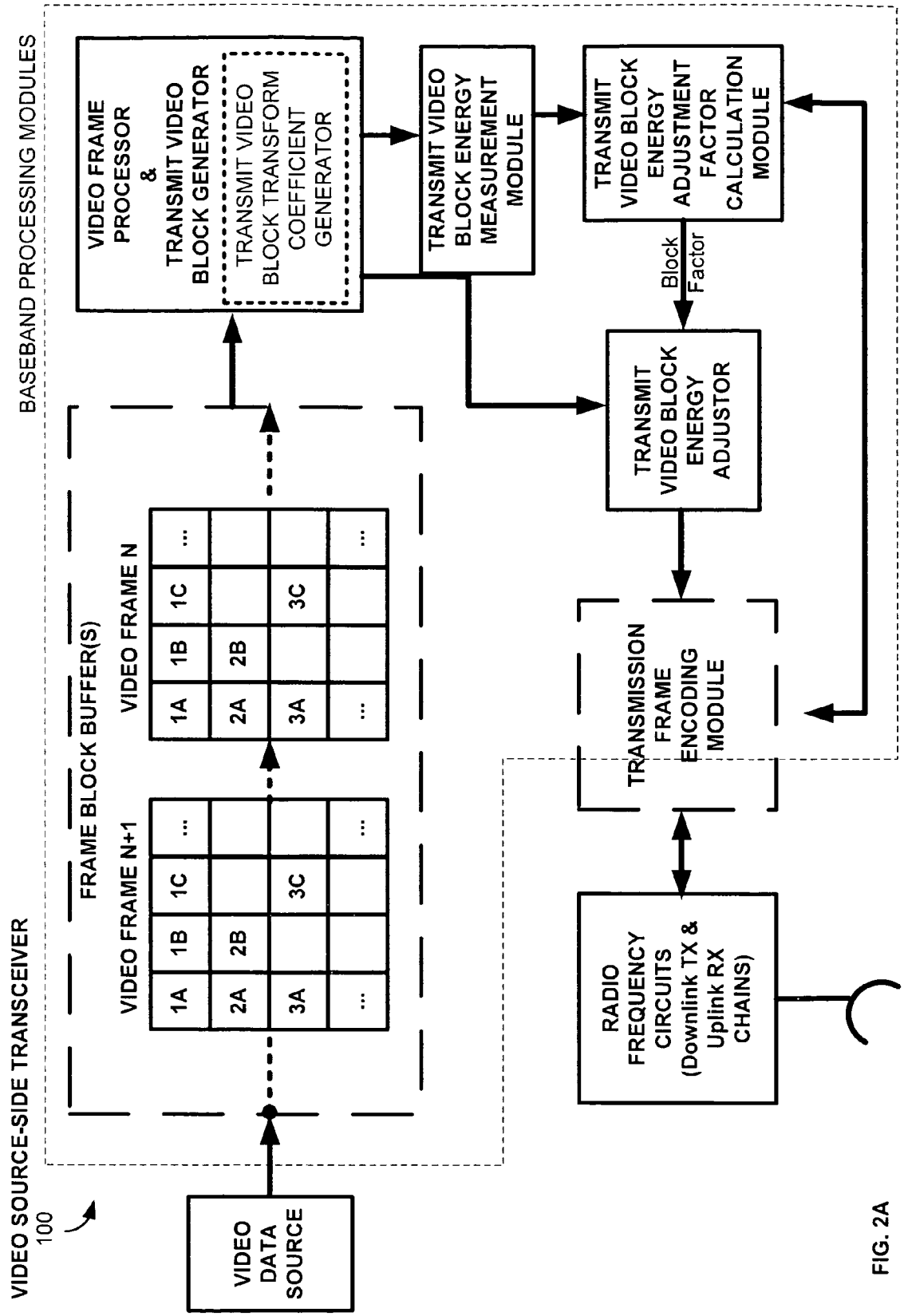
FIG. 2A is a functional block diagram of an exemplary source side video block transceiver according to embodiments of the present invention.
Figure 2B:
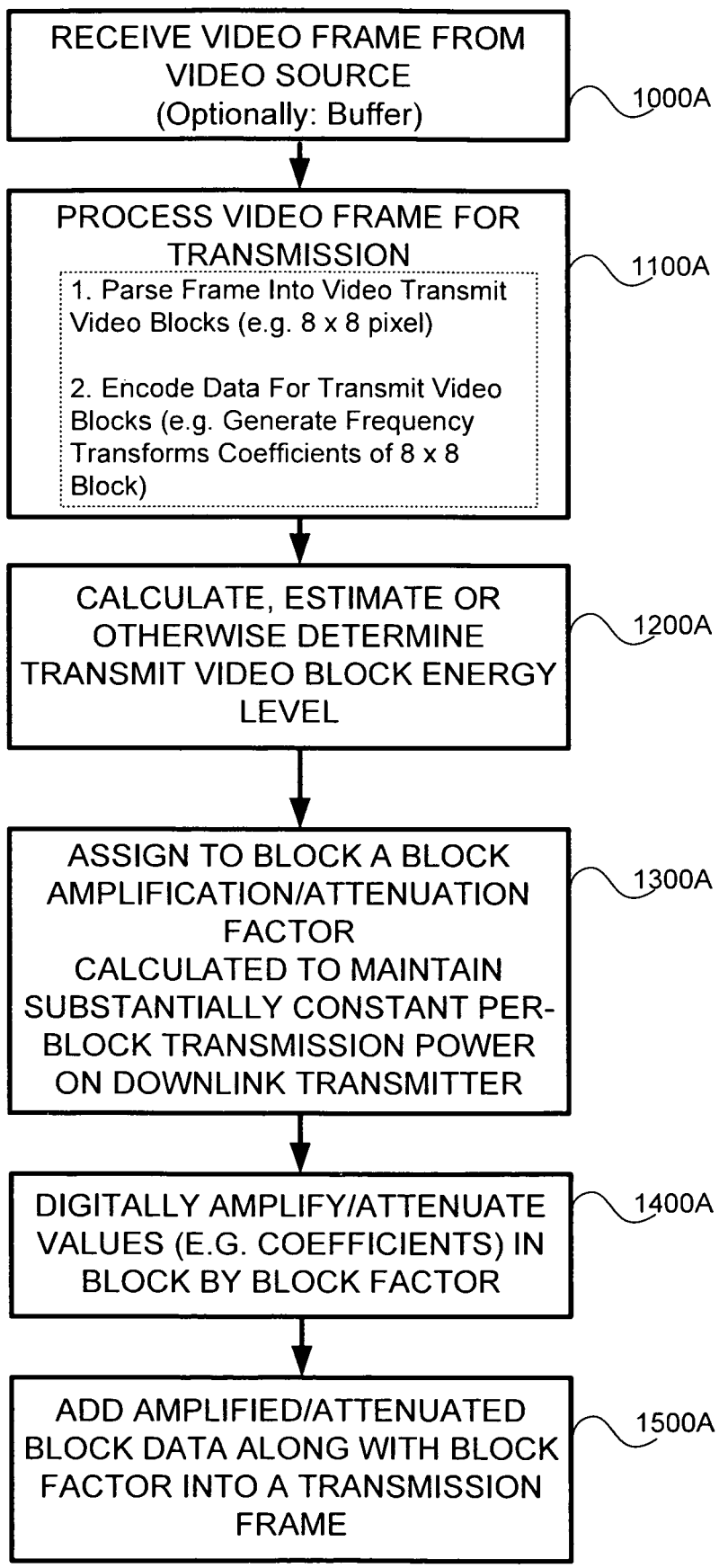
FIG. 2B is a flowchart including the steps of an exemplary method of transmitting a video block in accordance with embodiments of the present invention.

Turning now to FIG. 2A, there is shown a functional block diagram of an exemplary source-side video block transceiver according to some embodiments of the present invention. Operation of the source-side transceiver may be described in concert with FIG. 2B which is a flowchart including the steps of an exemplary method of transmitting a video block in accordance with embodiments of the present invention. Video frames received from a video source (e.g. Set-Top Box, DVD, etc.) may be buffered (Step: 1000A) in a buffer and may be processed (Step: 1100A) by a video frame processor so as to convert at least a portion of at least one of the video frames into one or a set of transmit video blocks, wherein a transmit video block may include frequency coefficients (e.g. discrete frequency coefficients) corresponding to a portion of the video frame converted. The energy level/value of each block may be estimated or measured (Step: 1200A) by a measurement module, and the energy level of a block or set of blocks may be adjusted (i.e. increased or decreased) by a gain or attenuation (Adjustment) factor selected such as to maintain a substantially constant (i.e. within a range) transmission power across the transmission of multiple transmit video blocks (Step 1300A). The selected factor may be applied by a transmit video block energy adjustor when adjusting or modifying an energy level; or value of a transmit video block (Step 1400A). An energy level/value of a transmit video block may be adjusted by modifying (e.g. multiplying or dividing by the selected factor) one or more values or elements in the transmit video block. A transmission frame encoding module (encoder) may generate a transmission frame data structure with payload data from one or more energy adjusted transmit video blocks (Step 1500A) and may forward the transmission frame data structure to radio frequency circuitry for wireless transmission.

Figure 2C:
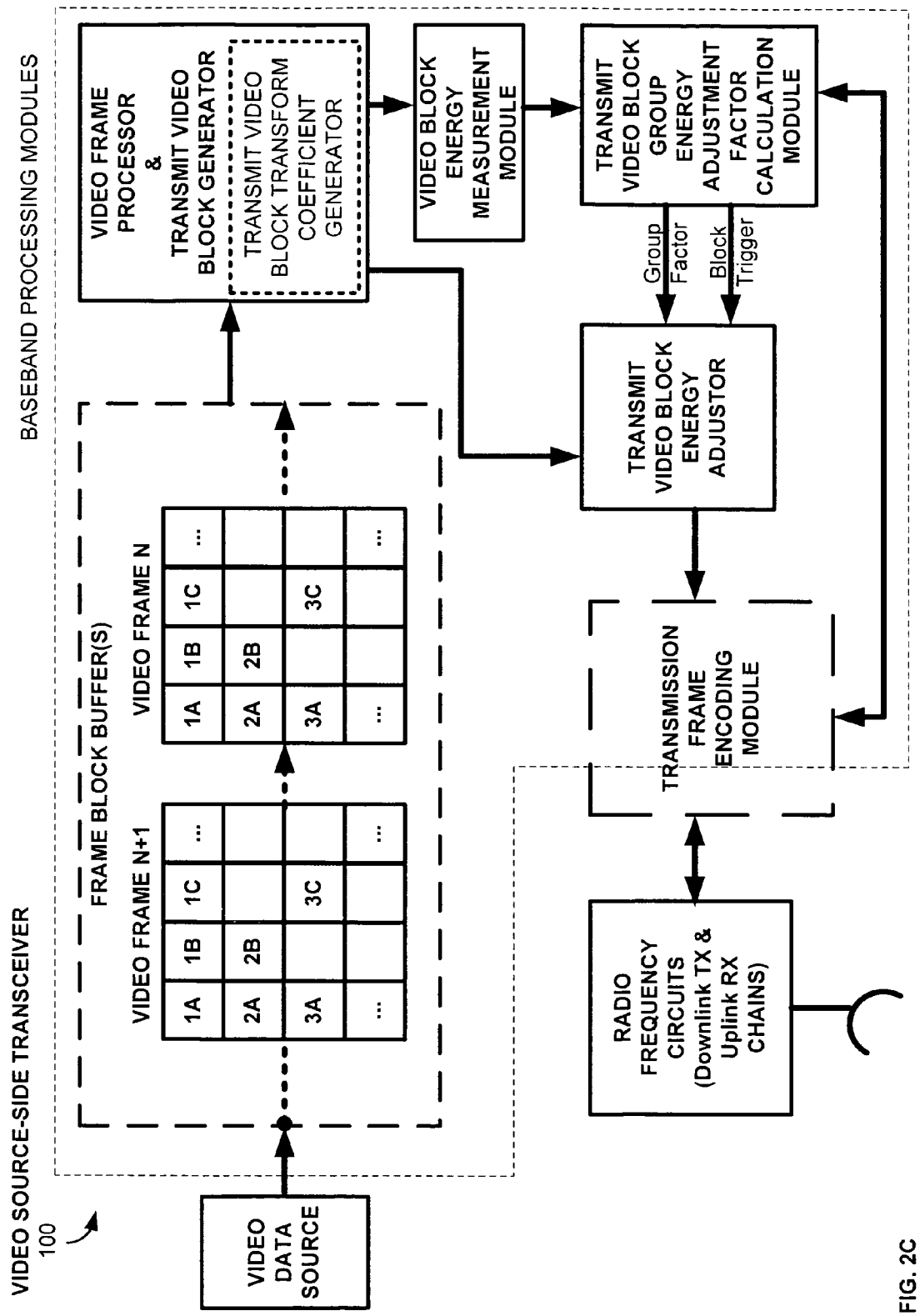
FIG. 2C is a functional block diagram of an exemplary source side video block transceiver according to embodiments of the present invention where a common gain factor is calculated for a group or set of video transmission blocks and the group gain factor is applied to some or all of the blocks in the group or set.
Figure 2D:
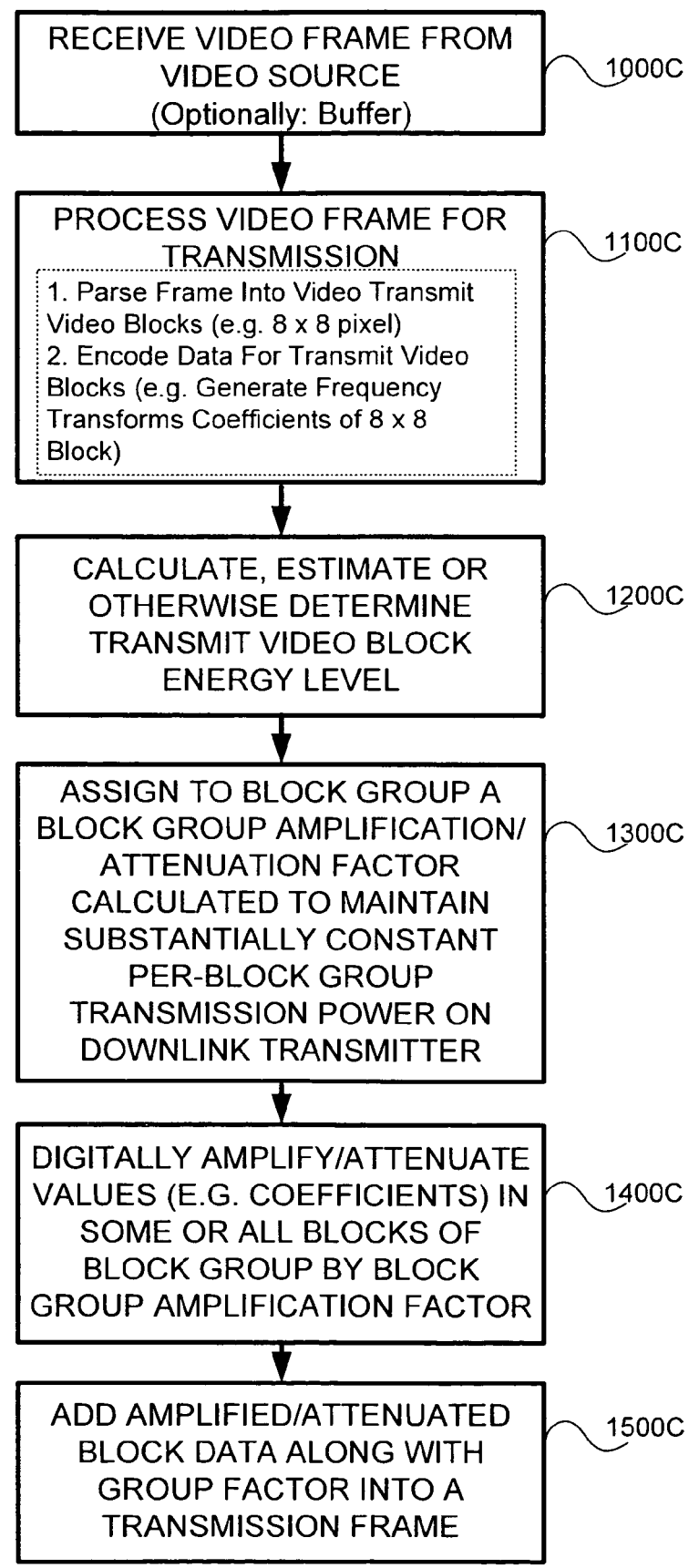
FIG. 2D is a flowchart including the steps of an exemplary method of transmitting a video block in accordance with embodiments of the present invention where a common gain factor is calculated for a group or set of video transmission blocks and the group gain factor is applied to some or all of the blocks in the group or set.

Turning now to FIG. 2C, there is shown a functional block diagram of an exemplary source side video block transceiver according to embodiments of the present invention where a common gain/attenuation factor is calculated for a group or set of video transmission blocks and the group gain/attenuation factor is applied to some or all of the blocks in the group or set. The operation of the transceiver may be described in view of FIG. 2D which is a flowchart including the steps of an exemplary method of transmitting a video block in accordance with embodiments of the present invention where a common gain factor is calculated for a group or set of video transmission blocks and the group gain factor is applied to some or all of the blocks in the group or set. The operation of the of the transceiver of FIG. 2C is substantially identical to that of FIG. 2A, with the exception that an amplification/attenuation factor (i.e. adjustment factor) is calculated for a group of transmit video blocks (Step: 1300C) and the transmit video block energy adjusts an energy level of a transmit video block (Step: 1400C) for all the member blocks of the group, or for a select subgroup of blocks (optionally identified by a trigger/signal from the transmit video block group energy adjustment factor calculation module).

Figure 3A:
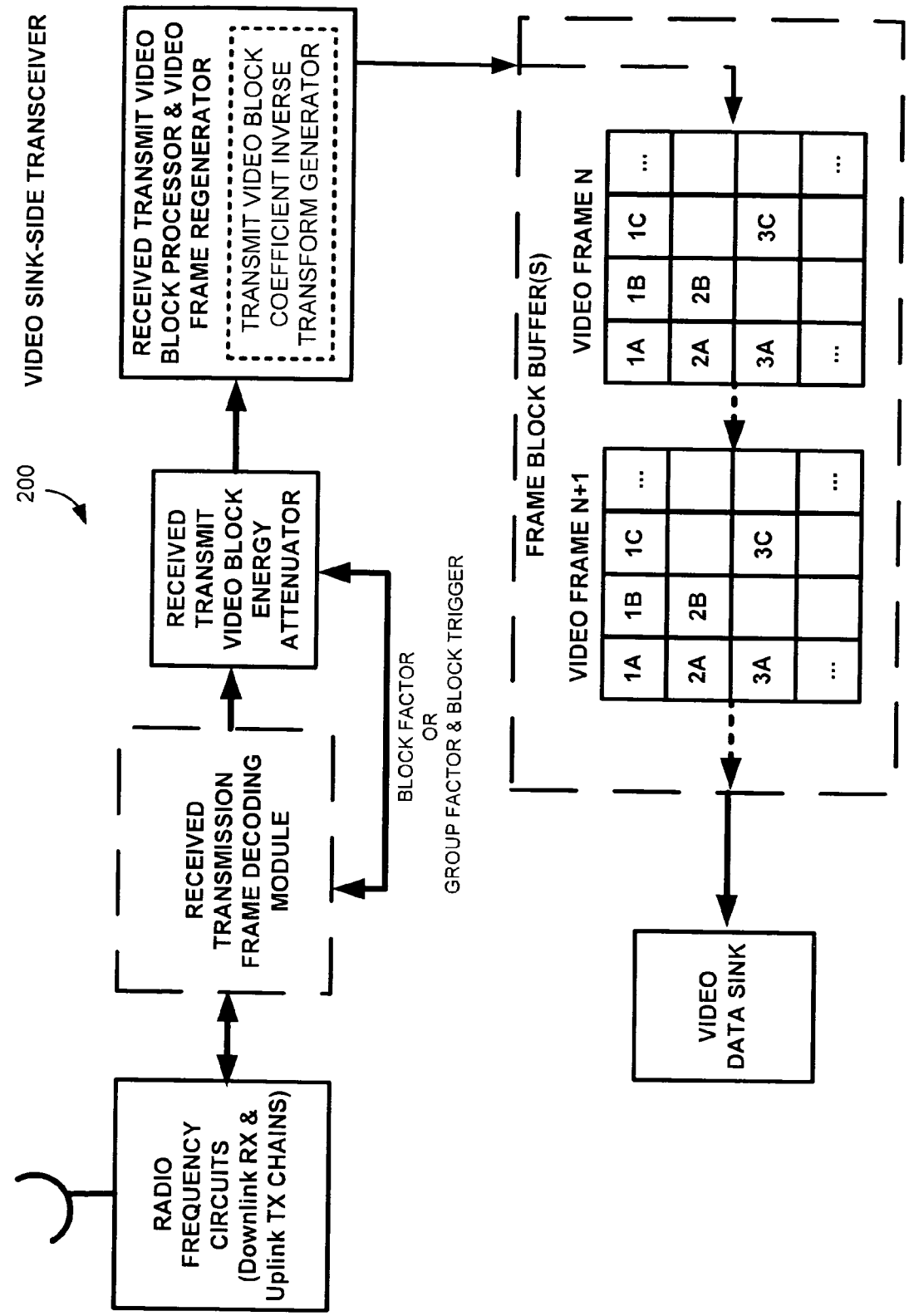
FIG. 3A is a functional block diagram of an exemplary sink side video block transceiver according to embodiments of the present invention.
Figure 3B:
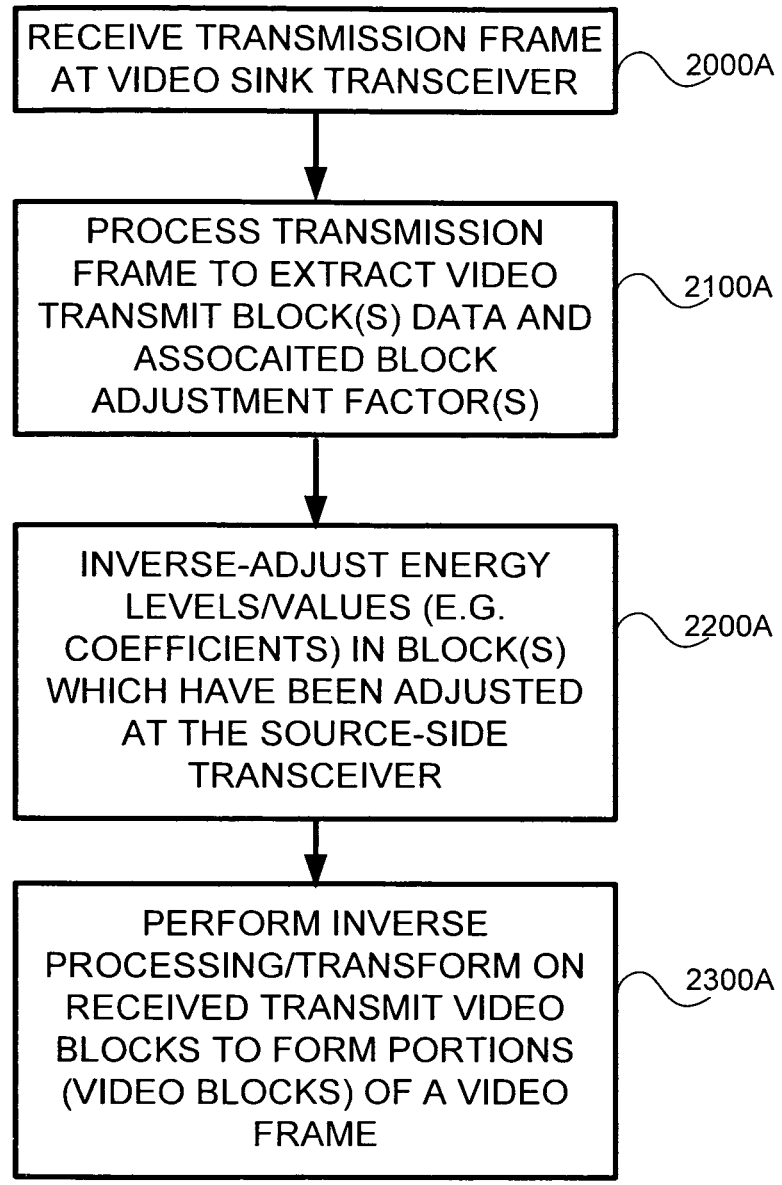
FIG. 3B is a flowchart including the steps of an exemplary method of receiving a video block in accordance with embodiments of the present invention.

Turning now to FIG. 3A, there is shown a functional block diagram of an exemplary sink side video block transceiver according to embodiments of the present invention. Operation of the transceiver may be described in view of FIG. 3B which is a flowchart including the steps of an exemplary method of receiving a video block in accordance with some embodiments of the present invention. A transmission frame may be received (Step: 2000A) and may be decoded (Step: 2100A) by a transmission frame decoding module. Decoding the transmission frame may extract from the transmission frame data associated with one or more transmit video blocks, some of which transmit video blocks may have had their energy level/value adjusted at the source-side transceiver. Decoding of the transmission frame may also extract an indication of the one or more adjustment factors by which one or a group of the extracted transmit video blocks were adjusted at the source-side transceiver.

One or more of the extracted transmit video blocks may have their energy level/value inverse-adjusted (Step: 2200A) based on either an individual block adjustment factor or by a group adjustment factor, in the event the block is part of a group with a common adjustment factor and there is an indication that the block was adjusted by that common/group adjustment factor. In the event there is no indication, explicit or implicit, that an extracted transmit video block had its energy level adjusted, step 2200A may be skipped. An extracted transmit video block, once inverse energy adjusted, may be inverse-proceeded to convert (Step: 2300A) it back into a renderable portion of a video frame, such as a set of pixel values of a video block of a video frame.

Figure 4:
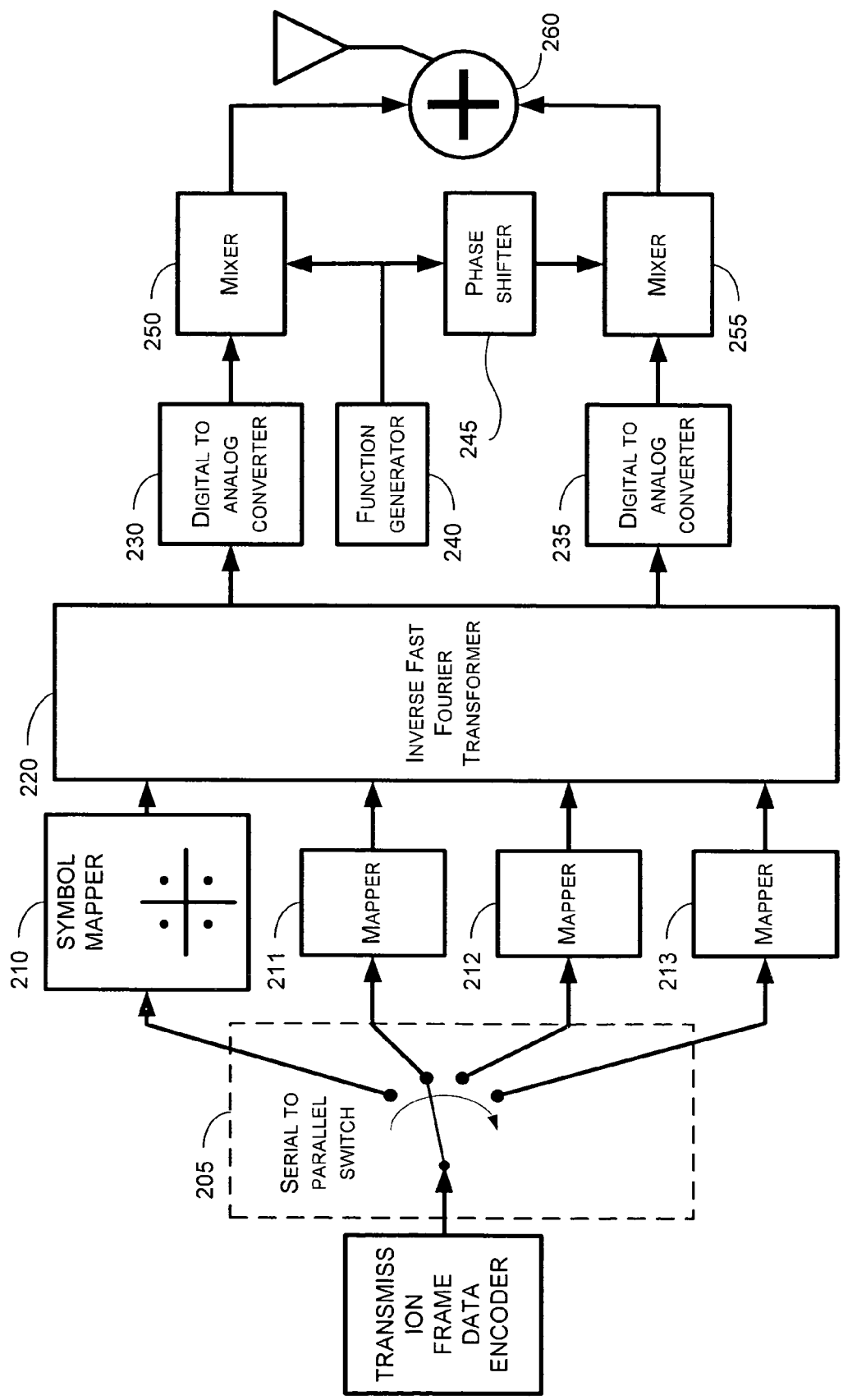
FIG. 4 is an exemplary Radio Frequency Data Transmission Circuit in accordance with some embodiments of the present invention.
Figure 5:
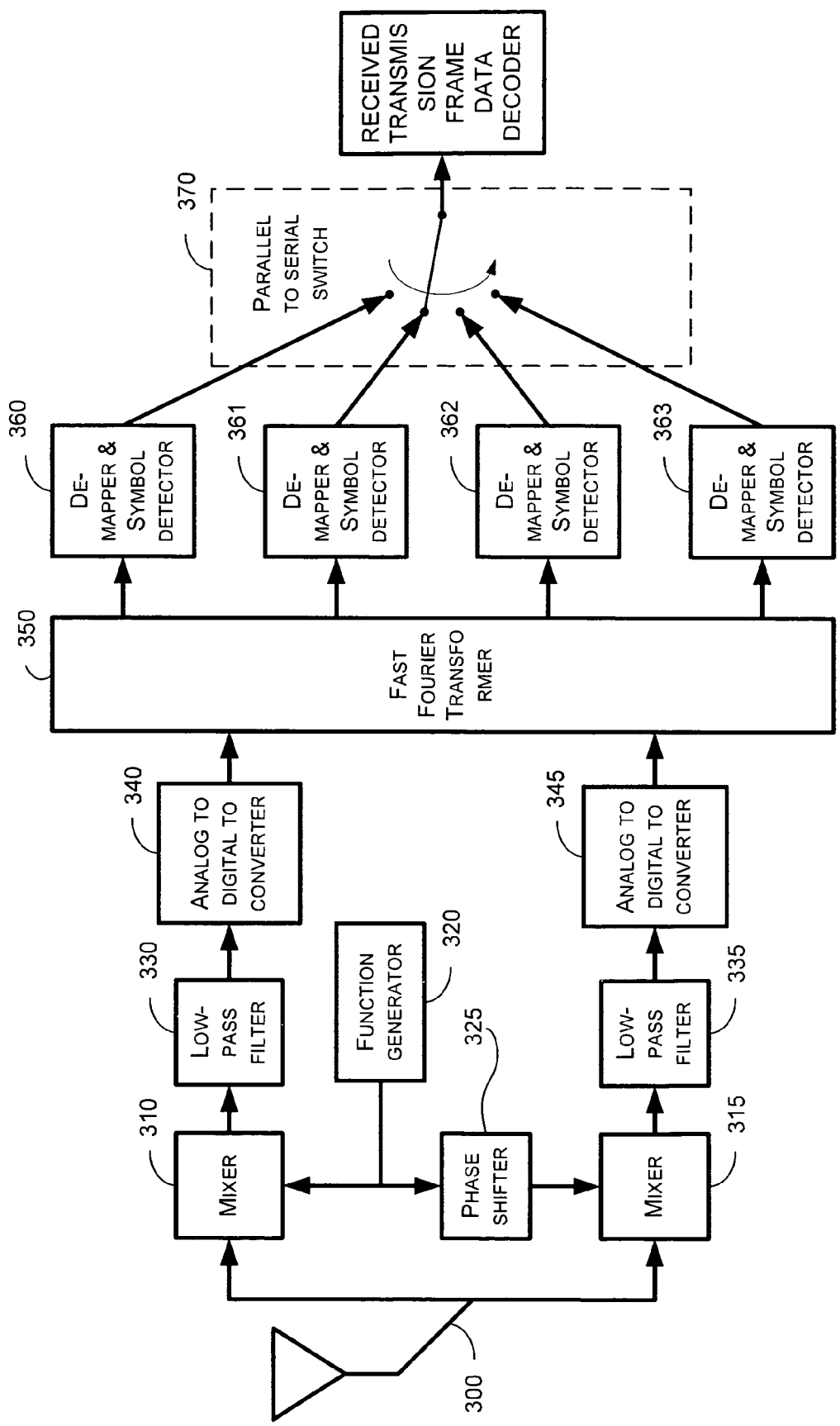
FIG. 5 is an exemplary Radio Frequency Data Reception Circuit in accordance with some embodiments of the present invention.

Turning now to FIG. 4, there is shown an exemplary Radio Frequency (e.g. OFDM) Data Transmission Circuit in accordance with some embodiments of the present invention. FIG. 5 is an exemplary Radio Frequency (e.g. OFDM) Data Reception Circuit in accordance with some embodiments of the present invention. Either of these circuits may be used as part of either a source-side or sink-side transceiver according to embodiments of the present invention.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A wireless video source transceiver comprising:
   a transmission block generator adapted to convert a set of pixel values into a video transmission block suitable for transmission;
   adjustment control logic adapted to determine an energy adjustment factor to be applied to said video transmission block such that transmission power fluctuation of a functionally associated transmitter is mitigated during transmission of said block; and
   a video block energy estimator adapted to estimate or measure an energy level or value for said transmission block prior to transmission;
   wherein said energy adjustment factor is based on said estimated or measured energy level or value for said transmission block.

2. The wireless video source transceiver according to claim 1, wherein said video block energy estimator is further adapted to estimate the energy level of a set of video transmission blocks to be transmitted together.

3. The wireless video source transceiver according to claim 2, wherein said digital control logic is further adapted to determine a common energy adjustment factor to be applied to the set of video transmission blocks.

4. The wireless video source transceiver according to claim 3, wherein the common energy adjustment factor to be applied to the set of video transmission blocks is selected such that a total energy value of the set of blocks is adjusted to a value within a target energy range.

5. The wireless video source transceiver according to claim 4, wherein the target energy range is substantially constant across multiple video transmission block sets.

6. The wireless video source transceiver according to claim 3, wherein said digital control logic is further adapted to determine whether to apply a common energy adjustment factor to a given video transmission block in the set based on an output of said video block energy estimator.

7. The wireless video source transceiver according to claim 1, wherein values within two or more video transmission blocks are transposed or scrambled such that energy value deviations across the two or more video transmission blocks is mitigated.

8. The wireless video source transceiver according to claim 1, further comprising a transmitter adapted to transmit a set of video transmission blocks, wherein transmission of a given set of blocks includes transmission of information relating to energy value adjustments performed on one or more video transmission blocks in the set.

9. The wireless video source transceiver according to claim 8, wherein transmission of a given set of blocks includes transmission of information relating to a common gain factor associated with the set of blocks.

10. A method of wireless video transmission comprising:
    converting a set of pixel values into a video transmission block suitable for transmission;
    estimating or measuring an energy level or value for said transmission block prior to transmission;
    determining an energy adjustment factor to be applied to said video transmission block such that transmission power fluctuation of a functionally associated transmitter is mitigated during transmission of said block;
    wherein said energy adjustment factor is based on said estimated or measured energy level or value for said transmission block.

11. The method according to claim 10, further comprising estimating the energy level of a set of video transmission blocks to be transmitted together.

12. The method according to claim 11, determining a common energy adjustment factor to be applied to the set of video transmission blocks.

13. The method according to claim 12, wherein the common energy adjustment factor to be applied to the set of video transmission blocks is selected such that a total energy value of the set of blocks is adjusted to a value within a target energy range.

14. The method according to claim 13, wherein the target energy range is substantially constant across multiple video transmission block sets.

* * * * *